(12) United States Patent
Oprea et al.

(10) Patent No.: US 9,621,576 B1
(45) Date of Patent: Apr. 11, 2017

(54) DETECTING MALICIOUS WEBSITES

(71) Applicant: EMC Corporation, Hopkinton, MA (US)

(72) Inventors: Alina Oprea, Arlington, MA (US);
Sumayah Alrwais, Bloomington, IN (US); Kevin D. Bowers, Melrose, MA (US); Todd S. Leetham, Bedford, MA (US); Zhou Li, Malden, MA (US);
Ronald L. Rivest, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/587,871

(22) Filed: Dec. 31, 2014

(51) Int. Cl.
G08B 23/00 (2006.01)
H04L 29/06 (2006.01)
H04L 29/08 (2006.01)

(52) U.S. Cl.
CPC .......... H04L 63/1441 (2013.01); H04L 67/30 (2013.01)

(58) Field of Classification Search
CPC ... H04L 41/026; H04L 41/0266; G06F 21/31; G06F 21/316; G06F 2221/2119
USPC .......................................................... 726/22
See application file for complete search history.

(56) References Cited

U.S. PATENT DOCUMENTS

| | | | | |
|---|---|---|---|---|
| 8,583,778 B1* | 11/2013 | Faigon | .................. | G06F 21/566 705/14.23 |
| 8,924,338 B1* | 12/2014 | Sheng | ................. | G06F 17/3023 706/52 |
| 9,124,622 B1* | 9/2015 | Falkowitz | ........... | H04L 63/1416 |
| 2011/0004850 A1* | 1/2011 | Lodico | .................... | G06Q 30/02 715/838 |
| 2012/0047581 A1* | 2/2012 | Banerjee | ............... | G06F 21/554 726/24 |
| 2012/0304287 A1* | 11/2012 | Yu | .......................... | G06F 21/56 726/22 |
| 2013/0097702 A1* | 4/2013 | Alhamed | ................ | G06F 21/64 726/22 |
| 2014/0164178 A1* | 6/2014 | Adjaoute | ........... | G06Q 30/0609 705/26.35 |
| 2014/0283069 A1* | 9/2014 | Call | .................... | H04L 63/1425 726/23 |
| 2014/0317754 A1* | 10/2014 | Niemela | ............. | H04L 63/1416 726/26 |

(Continued)

OTHER PUBLICATIONS

Borgolte et al, Delta: Automatic Identification of Uknown Web-based Infection Campaigns, ACM, Nov. 8, 2013, pp. 109-120.*

(Continued)

*Primary Examiner* — Christopher Brown
*Assistant Examiner* — Jenise Jackson
(74) *Attorney, Agent, or Firm* — Krishnendu Gupta; Jason A. Reyes

(57) ABSTRACT

There are disclosed techniques for use in detecting malicious websites. In at least one embodiment, there is disclosed a technique for generating a profile in connection with a website. The profile comprising at least one attribute associated with the website. The technique also comprises collecting information relating to the website during a visit to the website. The technique further comprises detecting a change in connection with the website. The detection of the change comprises identifying a variation between the generated profile and the collected information.

16 Claims, 7 Drawing Sheets

(56) References Cited

U.S. PATENT DOCUMENTS

| | | | |
|---|---|---|---|
| 2015/0033331 A1* | 1/2015 | Stern | H04L 63/1425 |
| | | | 726/22 |
| 2015/0039513 A1* | 2/2015 | Adjaoute | G06Q 20/4016 |
| | | | 705/44 |
| 2015/0348071 A1* | 12/2015 | Cochrane | G06Q 30/0204 |
| | | | 705/7.32 |

OTHER PUBLICATIONS

Anderson et al, Detecting Code Injection Attacks in Internet Explorer, IEEE, 2011, pp. 90-95.*

* cited by examiner

PROFILE: http://a.com/index.html

| URLs | | DOMAINS | | IPs | | FILE SIZES | | CONTENT TYPES | |
|---|---|---|---|---|---|---|---|---|---|
| http://a.com/index.html | 5 | a.com | 5 | 132.192.35.23 | 5 | 79001B | 3 | HTML | 7 |
| http://a.com/jquery.js | 4 | google-analytics.com | 5 | 173.194.69.100 | 5 | 75430B | 2 | JS | 9 |
| http://a.com/pic1.jpg | 3 | | | | | 35940B | 4 | Image | 6 |
| http://a.com/pic2.jpg | 3 | | | | | 103043B | 6 | | |
| http://a.com/refresh.html | 2 | | | | | 3310B | 2 | | |
| http://www.google-analytics.com/ga.js | 5 | | | | | 13443B | 5 | | |
| 410 | | 420 | | 430 | | 440 | | 450 | |

400

DETECTING MALICIOUS WEBSITES

TECHNICAL FIELD

The present invention relates generally to information technology (IT) security. More specifically, the present invention relates to a method, apparatus and computer program product for use in the detection of malicious websites.

BACKGROUND OF THE INVENTION

It is common for enterprises to monitor out-going network web traffic. Such out-going web connections are ideally largely enterprise-related (for example, communications with customers, affiliates, and partner sites), in support of system operations, or required by employees to perform corresponding job duties. In practice, however, a myriad of diverse activities are conducted within an enterprise over the hypertext transfer protocol (HTTP). A portion of such activities are commonly associated with benign user activities, such as web browsing and social media use, but it has also become increasingly common for malware and attackers to conduct suspect activities over HTTP in an attempt to blend into network activity and evade detection.

One conventional approach to preventing malicious activity on a computer network is to scan network traffic for malicious signatures listed on a signature blacklist. For example, network devices such as a firewall can be configured to block network traffic containing a specific domain (i.e., website), a specific IP address, or a specific Uniform Resource Locator (URL). Some network devices may even block network traffic if the network devices find blacklisted signatures within files, javascript and/or Flash objects.

Unfortunately, the above technique has disadvantages. For example, the above approach does not detect communications with potential "watering-hole" domains. These are legitimate domains likely visited by employees in a targeted organization that are compromised deliberately by attackers as a stepping stone to infect the victim enterprise. Typically, these websites are relatively popular within an enterprise, but not necessarily popular relative to a larger user population. Examples of potential "watering-hole" sites are a restaurant located close to the company or a development forum frequently accessed by company developers.

Accordingly, a need exists for further techniques that can detect potentially malicious websites.

SUMMARY OF THE INVENTION

There is disclosed a method, comprising: generating a profile in connection with a website, wherein the profile comprises at least one attribute associated with the website; during a visit to the website, collecting information relating to the website; and detecting a change in connection with the website, wherein detecting the change comprises identifying a variation between the generated profile and the collected information.

There is also disclosed an apparatus, comprising: at least one processing device, said at least one processing device comprising a processor coupled to a memory; wherein the apparatus is configured to: generate a profile in connection with a website, wherein the profile comprises at least one attribute associated with the website; during a visit to the website, collect information relating to the website; and detect a change in connection with the website, wherein detecting the change comprises identifying a variation between the generated profile and the collected information.

There is further disclosed a computer program product having a non-transitory computer-readable medium storing instructions, the instructions, when carried out by one or more processors, causing the one or more processors to perform a method of: generating a profile in connection with a website, wherein the profile comprises at least one attribute associated with the website; during a visit to the website, collecting information relating to the website; and detecting a change in connection with the website, wherein detecting the change comprises identifying a variation between the generated profile and the collected information.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Illustrative embodiments of the present invention will be described herein with reference to exemplary communication systems and associated processing devices. It is to be appreciated, however, that the invention is not restricted to use with the particular illustrative system and device configurations shown. Accordingly, a communication system or computing device, as used herein, is intended to be broadly construed so as to encompass any type of system in which multiple processing devices can communicate with one or more other devices.

Figure 1:
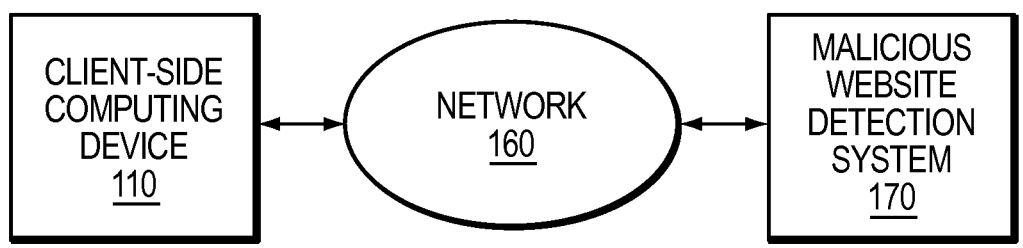
FIG. 1 is a diagram illustrating an example network environment in which one or more embodiments of the present invention can operate.

FIG. 1 illustrates an example client-side computing device (CSCD) 110 communicating with a malicious website detection system 170 over a network 160. The network 160 can include, for example, a global computer network such as the Internet, a wide area network (WAN), a local area network (LAN), a satellite network, a telephone or cable network, or various portions or combinations of these and other types of networks.

In at least one embodiment of the invention, the CSCD 110 is a customer server which updates the detection system 170 with data. Accordingly, the CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, or any other information processing device which can benefit from the use of detection techniques in accordance with the invention. It is to be appreciated that a given embodiment of the disclosed system may include multiple instances of CSCD 110 and possibly other system components, although only a single instance is shown in the simplified system diagram of FIG. 1 for clarity of illustration.

The CSCD 110 may also be referred to herein as simply a "user." The term "user," as used in this context, should be understood to encompass, by way of example and without limitation, a user device, a person (or employee, for example) utilizing or otherwise associated with the device, or a combination of both. An operation described herein as being performed by a user may therefore, for example, be performed by a user device, a person utilizing or otherwise associated with the device, or by a combination of both the person and the device. Similarly, information described as being associated with a user may, for example, be associated with a CSCD device 110, a person utilizing or otherwise associated with the device, or a combination of both the person and the device.

Figure 2:
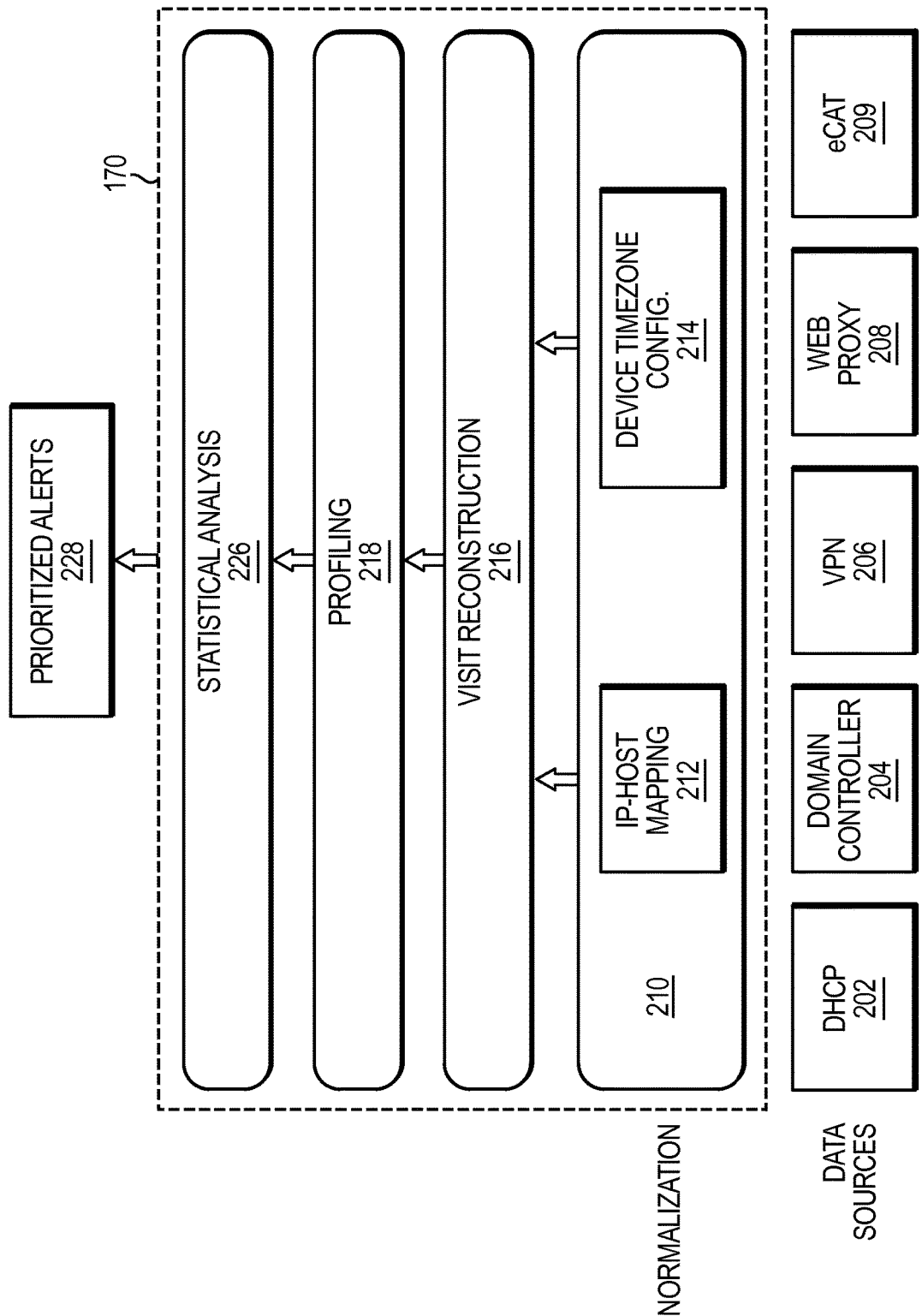
FIG. 2 is a block diagram illustrating example system components according to an embodiment of the invention.

An exemplary detection system (such as system 170 in FIG. 1) is described in additional detail below in connection with FIG. 2. Accordingly, FIG. 2 is a block diagram illustrating example system components, according to an embodiment of the invention. As depicted in FIG. 2, the web traffic detection system 170 acts on data received from various sources. Such data sources can include, for example, dynamic host configuration protocol (DHCP) servers 202, domain controllers 204, virtual private networks (VPNs) 206, web proxies 208 and enterprise malware threat detection software (such as, for example, eCAT) 209. Such data sources, as detailed herein, are processed and analyzed by the detection system 170 to ultimately generate alerts 228.

As also depicted in FIG. 2, the detection system 170 includes four layers: (1) a normalization layer 210 that includes functionality to parse, filter, and normalize log data using network-specific configuration information; (2) a visit reconstruction layer 216 that reconstructs visits to websites; (3) a profiling layer 218 that builds website profiles; and (4) a statistical analysis layer 226 that performs one or more analytical techniques to identify suspicious or malicious websites, which the system 170 reports as incidents and/or prioritized alerts 228.

During operation, the system 170 is configured to reconstruct user visits to a website from logs collected in the enterprise, build profiles of visits to the domains over time (aggregated over visits by multiple users), update them dynamically to account for changes in legitimate behavior, and detect when a user visit differs significantly from the historical profile. The system is configured to detect changes that are related to potential malicious behaviors. Examples of malicious changes include a new URL on the monitored website delivering a malicious payload, or direction to a new domain that is not typically included in a visit and that hosts the malicious payload.

In at least one embodiment, and as depicted in FIG. 2, the detection system 170 includes normalization layer 210, wherein the timestamps of all log entries are normalized (for example, normalized to Coordinated Universal Time (UTC)) via device time zone configuration component 214. Additionally, the normalization layer 210 determines statically and dynamically assigned IP addresses of hosts, and constructs bindings between hosts and IP addresses via IP-host mapping component 212, thus attributing every logged event to a specific host.

Referring back to the normalization layer 210, the device time zone configuration component 214 leverages the common use by enterprises of a central SIEM system for log management that tags each log entry with its own timestamp $t_{siem}$, recording the time at which the log was received by the SIEM. For each device that sends logs to the SIEM system, at least one embodiment of the invention includes computing a set of time difference values $\Delta_i = t_{siem,i} - t_{device,i}$ (that can be, for example, rounded off to the nearest 30 minutes) from each log entry i generated over a time period (for example, one month). Additionally, such an embodiment includes determining the timestamp correction value $\Delta_{correction}$ for the device by setting the correction value to the value $\Delta_i$ that accounts for the majority of differences. Applying this correction value to each device timestamp produces a normalized timestamp value, $t_{normalized,i} = t_{device,i} + \Delta_{correction}$. By way merely of example, $t_{normalized,i}$ can be configured to correspond to UTC. Additional description of an exemplary normalization technique can be found, for example, in U.S. patent application Ser. No. 13/731,654, entitled "Time Sanitization of Network Logs from a Geographically Distributed Computer System," filed on Dec. 31, 2012, and incorporated by reference herein in its entirety. Accordingly, at least one embodiment of the invention includes applying the above normalization technique to each device on the network that produces log data, normalizing all log timestamps (for example, to UTC).

Additionally, as depicted in FIG. 2, the web traffic detection system 170 includes IP-host mapping component 212 as a part of the normalization layer 210. The IP-host mapping component 212 analyzes DHCP server logs collected in the SIEM system and constructs a database of IP-to-host mappings (also referred to herein as bindings) over time. Each binding is represented as a tuple {IP address, hostname, media access control (MAC) address, start-time, end-time} mapping an IP address to a host in a specific time interval. The algorithm implemented to carry out the mapping can be run at intervals (for example, daily) to update existing bindings as new DHCP logs become available. Given the resulting database of bindings, at least one embodiment of the invention can identify the host corresponding to a given IP address with reference to a normalized timestamp. Additional description of an exemplary mapping technique can be found, for example, in U.S. patent application Ser. No. 13/731,643, entitled "Framework for Mapping Network Addresses to Hosts in an Enterprise Network," filed on Dec. 31, 2012, and incorporated by reference herein in its entirety.

As also depicted in FIG. 2, the visit reconstruction layer 216 is configured to reconstruct user visits to websites using the normalized data and/or other data in the data sources. Essentially, the visit reconstruction layer 216 reconstructs the visits by clustering log events into distinct groups. As will be appreciated, when a user lands on a website, a series of requests are issued during page loading and corresponding responses are returned to the user's browser. The visit reconstruction layer 216 reconstructs the set of events that occur during a page load by clustering a set of resources (URLs) loaded during a page load, and the associated meta-data, such as, timestamp, content type, user-agent string, web referrer, file size, IP address, etc. It should be noted that web content (e.g., the HTML code of a visited page) is not included as it is usually not present in the security logs.

Furthermore, as depicted in FIG. 2, the profiling layer 218 is configured to build profiles based on the reconstructed visits. For example, the profiling layer 218 builds a profile for a website that is a compact representation of a set of distinct visits to the website by multiple users. It should be appreciated that the profile is built initially during an observation period and updated at every visit. This will be described in further detail below.

Also, as depicted in FIG. 2, the statistical analysis layer 226 of system 170 applies a change-point detection algorithm inspired by CUSUM to each new visit to a website by comparing the visit to the historical website profile described above. The aim is to detect when the current visit differs significantly from the profile. If a significant change is detected, an alert about the possible compromise of the site is raised. To further confirm the compromise, enterprise security analysts needs to investigate the incidents using additional data sources (e.g., matching against blacklists, Indicators of Compromise, scanning of internal hosts visiting this site, etc.).

Figure 3:
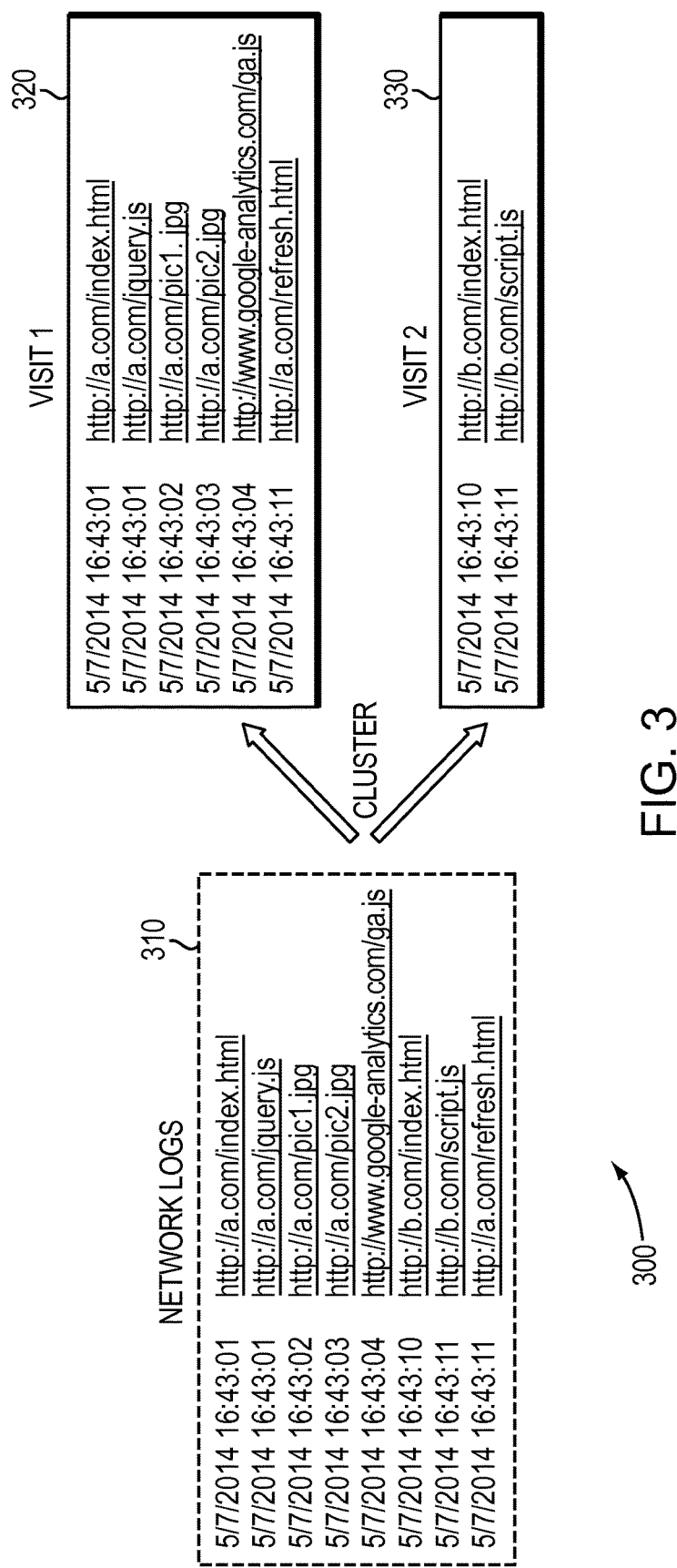
FIG. 3 is a diagram illustrating clustering of visits according to an embodiment of the invention.

FIG. 3 shows a process 300 performed by the visit reconstruction layer 216 for reconstructing visits to websites. In this particular embodiment, the process 300 comprises a number of steps. The process 300 starts by arranging logs 310 for each user. The process then proceeds to break up the logs 310 associated with each user into clusters (320, 330) using log timestamps. Finally, the process then proceeds to compare a log event and a cluster in order to determine the similarity between the log event and the cluster. These steps will be described in further detail below.

As discussed above, the initial step involves arranging logs 310 for each user. This step involves retrieving logs for a specific time period (e.g., day). As will be appreciated, these logs may include multiple events associated with multiple users. As a result, the logs 310 of individual users are separated using their respective source IP addresses. Once separated, the logs 310 are then sorted by timestamp in order to put order on the events.

Subsequently, the process 300 proceeds to cluster log events into distinct groups (320, 330). This step involves breaking up the logs 310 of the user into clusters (320, 330) using log timestamps. The key insight here is that a user usually visits websites sequentially by clicking the hyperlinks one by one so that there should be a minimum time interval between different visits. Therefore, two logs with timestamps within a threshold θ (e.g., 5 seconds) are grouped in the same cluster. If an event log has a timestamp that is greater than θ from the previous event by the same user, a new cluster is created for that event.

As will be appreciated, the generation of clusters based on the threshold θ may occasionally result in inaccuracies if a request belonging to one visit is issued at a later time. Such examples include periodical refresh of web pages and delayed HTTP redirection to another website. The system must also handle the case when multiple websites are loaded simultaneously, as could happen if multiple browser tabs are open. To adjust these misplaced log events, the process calculates the similarity between a log event l and previously formed clusters. For efficiency, a cluster summary is built for each cluster created. The cluster summary represents the abstraction of a visit, including the starting URL, list of referrers, web cookies, and URL patterns (with parameter values stripped off from URL) from all requests within a visit. The process compares log events only with summaries of previous clusters and not with all events in each cluster. If the similarity between current log event l and a cluster summary is above a certain threshold δ, then l is moved to that cluster and the cluster summary is updated. Note that for efficiency, l should be compared with most recent clusters first as the probability of having a large similarity is higher.

It should be understood that a cluster summary that is representative of a visit includes a starting URL for the visit, cookies used during the visit, most common URL patterns and the most common referrer field. Sometimes, the starting URL is not the first log event in a cluster as different logs can be reordered at the collection server. The process addresses this issue through a list of heuristics: if one log event is recorded at the beginning of a cluster within certain time interval from the first log event in the cluster (e.g., one second), has HTML content type, and its referrer is not most popular within the visit, that URL is considered as the starting URL of the visit. The cluster summary is updated dynamically while more event logs are added to a particular cluster.

In order to determine the similarity between a log event and a cluster, the process compares log event l with cluster $C_i$ using the following similarity metric:

$$Sim(C_i,l) = w1 \times check\_referrer(C_i,l) + w2 \times check\_cookie(C_i,l) + w3 \times check\_urlpattern(C_i,l) + w4 \times check\_starturl(C_i,l)$$

Four functions are defined to calculate similarity with weights w1, w2, w3, w4 selected to sum up to 1. The details of the four functions are described below:

check_referrer($C_i$,l): compares the referrer field of l with the most popular referrer in $C_i$. It returns 1 if they are exactly the same and 0 otherwise.

check_cookie($C_i$,l): compares the cookie field of l with all cookies in $C_i$. It returns 1 if there is a match and 0 otherwise.

check_urlpattern($C_i$,l): extracts the URL pattern from the request URL of l and compares with the most popular URL pattern in $C_i$. It returns 1 if the patterns match and 0 otherwise.

check_starturl($C_i$,l): extracts the hostname from the request URL in l and compares with the hostname of starting URL in $C_i$. It returns 1 if they match and 0 otherwise.

It should be appreciated that the parameters of the similarity metric can be tuned to achieve best accuracy. For example, w1, w2, w3, w4, δ can be set at 0.3, 0.2, 0.3, 0.2, 0.5, respectfully, in order to test the clustering process with sampled logs.

As discussed above, the profiler layer 218 is configured to build website profiles based on the clusters. Profiles are constructed over an initial observation period and then updated incrementally at every visit. Subsequent visits after the initial observation period are compared to the site profile and if they differ significantly an alert is raised.

Figure 4:
FIG. 4 is a diagram illustrating a profile according to an embodiment of the invention.

FIG. 4 shows one example of a website profile 400 that comprises fields of interest relating to URLs 410, domains 420, destination IPs 430, content types 440, and file sizes 450. As illustrated, the respective fields have unique values and a frequency count associated with each value. The profile as depicted herein relates to the URL path: visits are grouped if their starting URLs share the same path.

To bootstrap the detection system, a maximum number of visits may be selected within a time window to build the initial profiles and update the profile at every new visit in order to address the concept drifting issue in web sites. However, the generated profiles could still occupy significant space in storage. To reduce the storage overhead, a list of encoding techniques can be leveraged to compress site profiles. For instance, for URLs sharing the same prefix (which is common for URLs from the same site), we can store the prefix only once. Another method is to generate and store URL patterns, e.g., http://a.com/pic1.jpg and http:// a.com/pic2.jpg can be combined into http://a.com/*.jpg, but this approach provides less resilience to an adversary leveraging the site structure to add new malicious content.

Returning now to FIG. 2, the statistical analysis layer 226 is configured to use a statistical model for comparing a new visit to a site S to the historical website profile in order to detect significant changes. In a preferred embodiment, the statistical model is based on CUSUM algorithm. The description below describes the CUSUM algorithm as well as describing how it is adapted to the problem of detecting malicious websites. Further, there is described below several design choices in building the model and parameter selection.

Firstly, regarding the CUSUM algorithm, it should be noted that the algorithm can be given a sequence of observations $X_1, \ldots, X_n$ from a particular (unknown) probability distribution where $X_i \in U$ and $u=|U|$ and that the first w of these observations may be used to estimate a-priori probability distribution $P_0$. Thereafter, it should be further noted that for every observation $X_n$ where $n>w$, the probability distribution may be updated to $P_1^{(n)}$ such that the probability $P_1^{(n)}$ can be compared with the a-priori probability $P_0$ in order to detect if there are significant changes. The algorithm may also detect the most likely change point in the interval $[w+1, \ldots, n]$.

By way of example, the algorithm can proceed as follows:
1. A-priori probability estimation: Use frequency computation (with smoothing) for estimating the a-priori probability $P_0$.

$$P_0[j] = \frac{F^w[j] + \gamma}{w + \gamma u}, \text{ for } j \in U$$

where $F^W[j]$ represents the frequency of value j in the first w observations and $\gamma$ is a smoothing factor (set for example at 0.5) which controls the weight given to unseen items. Initially $P_1^{(w)} = P_0$.

2. Update probability $P_1^{(n)}$: At observation n, update the probability $P_1^{(n)}$ using a similar formula:

$$P_1^{(n)}[j] = \frac{F^n[j] + \gamma}{n + \gamma u}, \text{ for } j \in U$$

3. Compute the test statistic: Compute for the n-th observation $X_n$:

$$Z^{(n)} = \max\left(0, Z^{(n-1)} + \log\frac{P_1^{(n)}[X_n]}{P_0[X_n]}\right)$$

with $Z^{(0)}=0$.

4. Detect change: If $Z^{(n)} \geq \tau$ (for $\tau$ a certain threshold), detect change and output point $\lambda^* = \max\{\lambda | Z^{(\lambda)} = 0, w < \lambda \leq n\}$.

As discussed above, this approach may be adapted to the problem of detecting malicious websites. For example, S may be the site of interest that is monitored over time. Also, there may be a number of visits $V_1, \ldots, V_n$ to this site over the observation period. In at least one embodiment, the first w visits may be used to build the initial profile and the corresponding a-priori probability distribution $P_0$. In the event of a new visit Vn, the aim is to detect if the probability distribution $P_1^{(n)}$ computed over all visits $V_1, \ldots, V_n$ is different from $P_0$ and the most likely change point $w < \lambda \leq n$.

In at least one embodiment, the approach consists of (1) building a CUSUM model for each attribute of interest (inferring the corresponding probability distributions $P_0$ and $P_1^{(n)}$) and detecting changes under each of these attributes, (2) applying a number of filtering rules to reduce the number of false positives and (3) combining changes under multiple attributes and raising an alarm for most suspicious changes. This approach will be described further below.

It should be understood that CUSUM model may be adapted for categorical attributes; for example, the set of distinct URLs encountered during visits to site S. In such a case, an observation $V_i$ is a list of URLs included in the visit and $V_i = (u_{i,1}, \ldots, u_{i,mi})$, where each $u_{i,j}$ is an URL from a set of valid URLs U and $m_i$ is the number of distinct URLs at the i-th visit. Note that the set U may be infinite, and thus assigning a small probability to each item in U as in the CUSUM algorithm is not viable.

Instead, it is proposed that the profile for site S maintains a placeholder New that denotes a new encountered URL during a visit. Initially, a small probability is assigned to New, but this is adjusted over time as more visits are observed. At visit $n \geq 2$ the probability of a new URL is the ratio of the number of new URLs observed in this visit (relative to all previous visits) over the number of all URLs loaded in the visit. The probability of New after n visits is the average of the probability of a new URL observed in visits $1, \ldots, n$.

Thus, the adapted algorithm is as follows:
1. A-priori probability estimation: Use the first w visits to estimate the a-priori probability $P_0$ for every URL observed in these visits and the probability of encountering a new URL. Let $F^w[u]$ represent the frequency of URL u in the first w visits and $U_w$ the set of all URLs encountered in the first w visits.

$P_0[\text{New}] \leftarrow \epsilon$, for some small $\epsilon$, e.g., $\epsilon = 0.01$
for $i=2, \ldots, w$:

$\text{New}_i \leftarrow V_i \backslash (V_1 \cup \ldots \cup V_{i-1})$ //Set of new URLs in this visit $R_i \leftarrow |\text{New}_i|/m_i$ //Rate of new URLs in this visit.

$$P_0[\text{New}] \leftarrow \frac{(i-1)P_0[\text{New}] + R_i}{i}$$

Denote $P_0^w \leftarrow P_0[\text{New}]$
Then for every URL $u \in U_w$:

$$P_0[u] = \frac{F^w[u]}{\sum_v F^w[v]} - \frac{P_0^w}{|U_w|}$$

Set $P_1^{(w)} \leftarrow P_0$
2. Update probability $P_1^{(n)}$: At visit $n > w$, given observation $V_n$, create set $U_n$ of all encountered URLs in the first n visits and compute the frequency $F^n[u]$ of each URL $u \in U_n$.
To update $P_1^{(n)}[\text{New}]$ use:

$\text{New}_n \leftarrow V_n \backslash (V_1 \cup \ldots \cup V_{n-1})$ //Set of new URLs in visit $n$.

$R_n \leftarrow |\text{New}_n|/m_n$ //Rate of new URLs in visit $n$.

$$P_1^{(n)}[\text{New}] \leftarrow \frac{(n-1)P_1^{(n-1)}[\text{New}] + R_n}{n}$$

Denote $P_1^n \leftarrow P_1^{(n)}[\text{New}]$
Update the probability $P_1^{(n)}[u]$ for all $u \in U_n$ using:

$$P_1^{(n)}[u] = \frac{F^n[u]}{\sum_U F^n[v]} - \frac{P_1^n}{|U_n|}$$

3. Compute the test statistic: Let $V_n$ be the set of URLs encountered in visit n, $\text{New}_n$ the set of new URLs in visit n (if any) and $V_n'$ the set of URLs in visit n that belong to at least one previous visit.
Then $V_n = \text{New}_n \cup V_n'$.
Compute the probability of $V_n$ under both distributions $P_0$ and $P_1^{(n)}$ as:
If $\text{New}_n = \Phi$ (no new URLs):

$$P_0[V_n] = \prod_{u \in V_n} P_0[u]$$

$$P_1^{(n)}[V_n] = \prod_{u \in V_n} P_1^{(n)}[u]$$

else:

$$P_0[V_n] = P_0[\text{New}] \prod_{u \in V_n'} P_0[u]$$

$$P_1^{(n)}[V_n] = P_1^{(n)}[\text{New}] \prod_{u \in V_n'} P_1^{(n)}[u]$$

Compute the test statistic as:

$$Z^{(n)} = \max\left(0, Z^{(n-1)} + \log \frac{P_1^{(n)}[V_n]}{P_0[V_n]}\right)$$

with $Z^{(0)} = 0$

4. Detect change: If $Z^{(n)} \geq \tau$ (for $\tau$ a certain threshold), detect change and output point $\lambda^* = \max\{\lambda | Z^{(\lambda)} = 0, w < \lambda \leq n\}$.

It should be appreciated that the application of adapted algorithm may result in some false positives. Accordingly, the invention as disclosed herein may also filter for false positives. Examples include:

Filter changes based on URL content type: The techniques discussed herein are interested in monitoring changes that result in a potential infection vector and thus the techniques restrict to URLs with content types indicative of binary files (e.g., application/octetstream, application/x-compress).

Filter popular URLs within the enterprise: The techniques discussed herein can use the entire host population in the enterprise to compute for each URL the number of hosts visiting that URL over an observation period of several months. The techniques can then filter changes triggered by popular URLs (those visited by a large number of hosts) as they are less likely involved in malicious activities.

Filter globally popular URLs: The techniques discussed herein can leverage the global Alexa list and extract domain popularity. The list provides a global popularity rank at the level of domains, and not individual URLs. It can be decided to filter a URL if it belongs to a domain of high rank (e.g., top 10,000 domains in Alexa).

Further to the above, it should be appreciated that a model is generated for each attribute of interest (e.g., set of URLs, set of domains, content types, IP subnets or ASN numbers). Further, an anomaly score is assigned to each visit as a function of changes detected under different attributes. Every attribute change should increase the anomaly score. Based on the score, visits are prioritized that result in changes of multiple attributes. For instance, a new URL on a site that is serving a new content type (e.g., RAR) not observed before on that site could result in a higher probability of malicious change.

It should be further appreciated that the score can be implemented as a simple additive function counting the number of attributes for which change is detected. Alternatively, the score could be a more complex function considering different weights for different attributes and measuring the significance of the change of every attribute relative to its profile.

The technique as described herein also sets thresholds for detecting changes when the test statistic $Z(n)$ exceeds a threshold $\tau$. There are several options for setting up the thresholds:

1. The threshold is chosen statically for each attribute. A number of attributes extracted from visits to legitimate sites can be measured over time, and based on these measurements the threshold for each attribute can be chosen to reduce the number of false positives and at the same time effectively capture malicious changes.

2. We can set the threshold adaptively, e.g., consider the threshold $\tau n$ at each iteration be a function of the observed test statistics so far. For example, $\tau n$ could be set as the maximum of any $Z^{(1)}, \ldots, Z^{(n-1)}$ (or higher than the maximum by a certain fraction). This approach can tolerate legitimate changes in attribute values and can detect significant changes assuming a sufficient number of observations.

As discussed above, in the original CUSUM algorithm, $P_0$ is the a-priori probability distribution computed using the initial w observations and changes are always detected relative to $P_0$. In reality, modern websites undergo a number of legitimate changes, and it is important to update $P_0$ to reflect these legitimate changes over long time periods. There are several options when updating $P_0$:

1. Periodically (e.g., every week or every month) reconstruct $P_0$ from a set of w new observations. While the new $P_0$ is reconstructed, the old a-priori probability can be used in the CUSUM algorithm, but once a new $P_0$ is regenerated, it can be used in the CUSUM algorithm for new observations. This method has the advantage of simplicity but as a limitation it does not include historical data in the a-priori probability estimation.

2. Another approach is to update both $P_0$ and $P_1^{(n)}$ gradually over time, using a sliding-window algorithm. At every new visit $V_n$, for all $u \in U_n$:

$$P_0[u] \leftarrow \lambda_0 P_0[u] + (1-\lambda_0) I[u]$$

$$P_1^{(n)}[u] \leftarrow \lambda_1 P_1^{(n)}[u] + (1-\lambda_1) I[u]$$

where $I[u]$ is an indicator variable set to 1 if $u \in V_n$ and 0 otherwise.

The use of weights $\lambda_0$ and $\lambda_1$ can control how much $P_0$ and $P_1^{(n)}$ depend on historical data and how much they adapt to the new visit. In general, it is recommended that $\lambda_0 > \lambda_1$ so that $P_0$ changes at a slower rate than $P_1^{(n)}$. We can set these parameters at $\lambda_0 = 0.99$ and $\lambda_1 = 0.8$.

It should also be understood that the techniques described herein may be configured to detect abrupt changes in rate of new items of a time series. For example, there may be a number of observations (or visits) $V_1, \ldots, V_n$ to a site of interest over the observation period. Each visit consists of several attributes, e.g., set of distinct URLs loaded, set of distinct domains, file sizes, etc. Consider the problem of detecting changes in the rate of new items of a categorical time series. Take the example, as above, of a visit consisting of the set of URLs loaded. The rate of new URLs for visit i is defined as:

$$R_i \leftarrow |New_i|/m_i$$

where $New_i$ is the set of new URLs loaded in visit I (relative to previous visits), and $m_i$ is the total number of URLs in visit i.

It should be understood that the goal is to detect when the rate of new URLs in a visit changes significantly relative to the historical profile. The time series $R_1, \ldots, R_n$ is numerical with values $R_i \in [0,1]$. A variant of the CUSUM algorithm is also introduced for detecting abrupt changes in a numerical time series:

1. Bin definition: Define a number of fixed bins b (e.g., b=1000) and divide the interval [0,1] into b bins $b_i = [i/b, (i+1)/b)$, $i \in \{0, \ldots, b-1\}$. As observation $R_i$ belongs to a particular bin $b_j$ if $j/b \leq R_i < (j+1)/b$. $b_j$ denoted as $Bin(R_i)$.
2. A-priori probability estimation: Estimate the a-priori probability $P_0$ on every bin from the first w observations.

$$P_0[b_i] = \frac{F^w[b_i]}{w}, \text{ for } i \in \{0, \ldots, b-1\}$$

Where $F^w[b_i]$ represents the number of values in $\{R_1, \ldots, R_w\}$ that fall in bin i.
Initially $P_1^{(w)} = P_0$.
3. Update probability $P_1^{(n)}$: At observation $n>w$, update the probability $P_1^{(n)}$ using a similar formula:

$$P_1^{(n)}[b_i] = \frac{F^n[b_i]}{n}, \text{ for } i \in \{0, \ldots, b-1\}$$

4. Compute the test statistic: Compute for the n-th observation $R_n$ (whose value is in bin $Bin(R_n)$):

$$Z^{(n)} = \max\left(0, Z^{(n-1)} + \log\frac{P_1^{(n)}[Bin(R_n)]}{P_0[Bin(R_n)]}\right)$$

with $Z^{(0)} = 0$
5. Detect change: If $Z^{(n)} \geq \tau$ (for $\tau$ a certain threshold), detect change and output point $\lambda^* = \max\{\lambda | Z^{(\lambda)} = 0, w < \lambda \leq n\}$.

Figure 5:
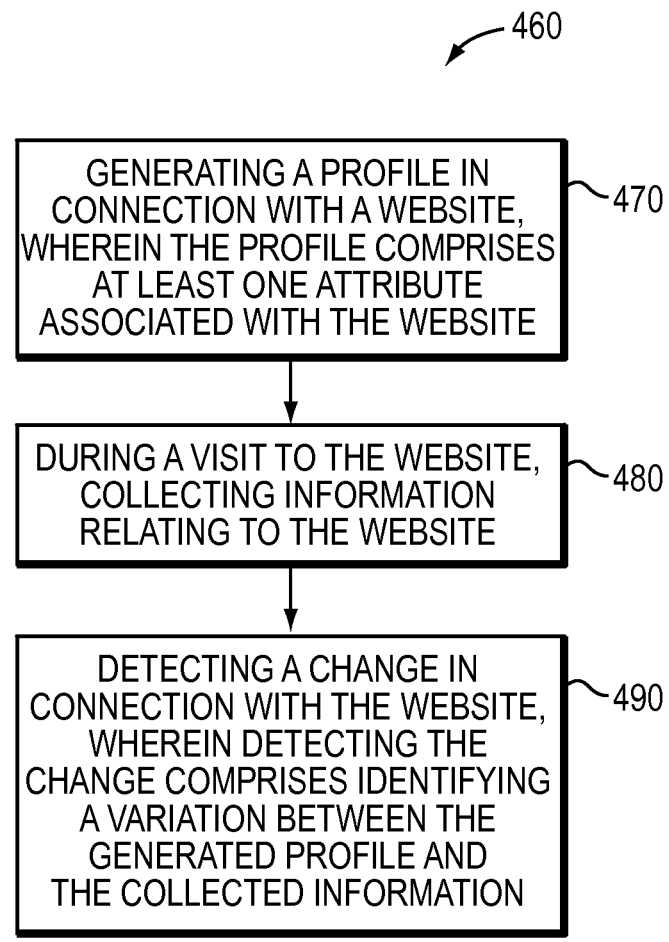
FIG. 5 is a flow diagram illustrating a technique according to an embodiment of the invention.

FIG. 5 is a flow diagram illustrating techniques according to an embodiment of the invention. In at least one embodiment, there is disclosed a technique 460 comprising the step 470 of generating a profile in connection with a website. The profile comprising at least one attribute associated with the website. The technique also comprises the step 480 of collecting information relating to the website during a visit to the website. The technique further comprises the step 490 of detecting a change in connection with the website (e.g., based on CUSUM). The detection of the change comprises identifying a variation between the generated profile and the collected information.

It should be understood that the step 470 of generating the profile can involve reconstructing a historic visit to the website. For example, the reconstruction of the visit may comprise retrieving log information in connection with the historic visit to the website and reconstructing the historic visit based on the retrieved log information. As a result, the generated profile may include at least one website attribute relating to the reconstructed historic visit to the website. Alternatively, the step 470 of generating the profile can be based on repeated visits to the website (e.g., crawling).

Regardless of the approach to generating the profile, the profile may comprise at least one attribute relating to at least one of a URL, a domain, an IP address, a content type and a file size. As will be appreciated, the aforementioned are just some possible attributes. It should also be noted that the technique can count occurrences, keep patterns (regular expressions), cluster or apply Principal Component Analysis (PCA) to reduce dimensionality, etc. There are also additional features that may be of interest, such as, number of resources requested, timing between resource download, number of domains contacted, distribution across domains, etc.

It should also be understood that regardless of the technique used to detect change (step 490) the profile will continue to be updated as time progresses. This was discussed above in regard to updating $P_0$ for CUSUM but similar techniques could be used for other combinations of features and analysis techniques.

It should be understood that the step 490 of detecting change may also involve many different approaches. For example, a threshold may be set for how many new domains are contacted, or a fraction of new domains relative to old domains, or edit distance (minimum number of links that would have to change from the old pattern to achieve the new one), or just the ratio of new domains contacted on a particular visit versus how many are contacted in the profiled visits. These approaches are all viable. Additionally, as described in previous paragraphs, and further in the following paragraph, a preferred embodiment is the application of CUSUM to detect change.

In a preferred embodiment, the step 490 of detecting change is based on CUSUM. The step comprises determining a-priori probability estimation based on the profile. Additionally, the step comprises determining an update probability based on the collected information. Moreover, the step comprises identifying the change between the a-priori probability estimation and the update probability. It should also be noted that CUSUM may be applied to categorical attributes.

In another embodiment, the technique 460 may comprise assigning a score to the change. Also, the technique 460 may comprise comparing the score to a threshold. Further, the technique 460 may comprise sending an alert in response to a relationship between score and threshold (e.g., score exceeds the threshold).

Figure 6:
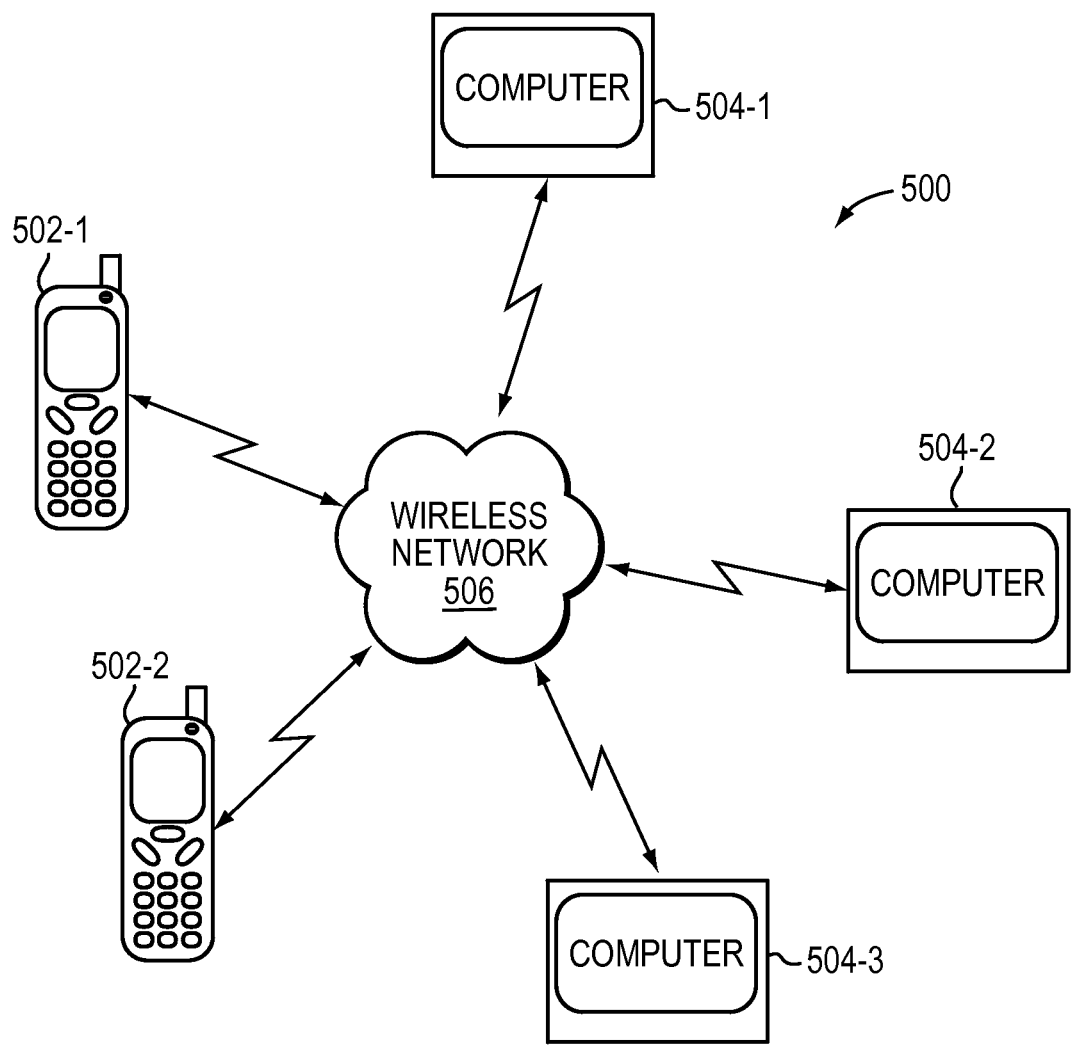
FIG. 6 shows an exemplary embodiment of a communication system that may incorporate the functionality of the type illustrated in at least one embodiment of the invention.

Suspicious website detection techniques of the type described herein may be implemented in a wide variety of different applications. One exemplary communication system applications that may incorporate such techniques will now be described with reference to FIG. 5. Accordingly, FIG. 6 depicts a communication system 500 comprising a plurality of mobile telephones 502-1 and 502-2 and computers 504-1, 504-2 and 504-3, configured to communicate with one another over a network 506. For instances, such mobile telephones (for example, smart phones) and computers can be devices associated with employees and/or users within an enterprise network. It should be also be noted and appreciated that despite the limited number of devices illustrated in FIG. 6, the techniques described herein are scalable and, accordingly, can also be incorporated and/or implemented in connection with networks of much larger size.

Any of the devices 502 and 504 may correspond to computing devices configured to implement at least one embodiment of the invention, as previously described. It is to be appreciated that the techniques disclosed herein can be implemented in numerous other applications.

Aspects of the present invention are described herein with reference to flowchart illustrations and/or block diagrams of methods, apparatus, systems and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each module embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 7:
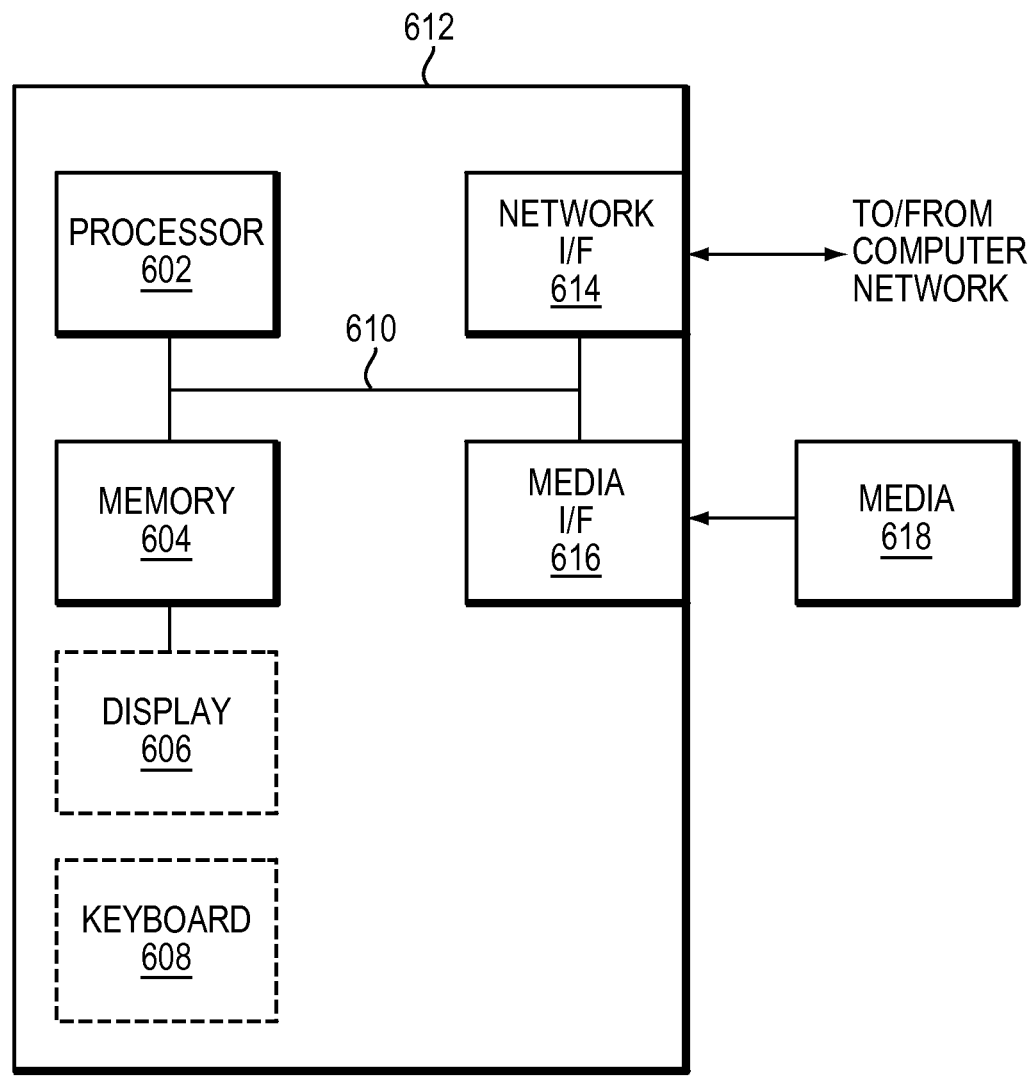
FIG. 7 is a system diagram of an exemplary computer system on which at least one embodiment of the invention can be implemented.

By way of example, an aspect of the present invention can make use of software running on a general purpose computer. As noted above, FIG. 7 is a system diagram of an exemplary computer system on which at least one embodiment of the invention can be implemented. As depicted in FIG. 6, an example implementation employs, for example, a processor 602, a memory 604, and an input/output interface formed, for example, by a display 606 and a keyboard 608. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 602, memory 604, and input/output interface such as display 606 and keyboard 608 can be interconnected, for example, via bus 610 as part of a data processing unit 612. Suitable interconnections via bus 610, can also be provided to a network interface 614 (such as a network card), which can be provided to interface with a computer network, and to a media interface 616 (such as a diskette or compact disc read-only memory (CD-ROM) drive), which can be provided to interface with media 618.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 608, displays 606, and pointing devices, can be coupled to the system either directly (such as via bus 610) or through intervening I/O controllers.

Network adapters such as network interface 614 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 612 as depicted in FIG. 6) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing.

Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a LAN or a WAN, or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit (s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from suspicious web traffic detection techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising:
   generating, by processing circuitry, a profile in connection with a website, wherein the profile comprises at least one attribute associated with the website;
   during a visit to the website, collecting, by processing circuitry, information relating to the website;
   detecting, by processing circuitry, a change in connection with the website, wherein detecting the change comprises identifying a variation between the generated profile and the collected information;
   assigning, by processing circuitry, a score based on the change;
   comparing, by processing circuitry, the score to a threshold; and
   in response to a relationship between the score and the threshold, sending, by processing circuitry, an alert identifying a suspicious or malicious website;
   wherein detecting the change, comprises:

based on the profile, determining a-priori probability estimation;
based on the collected information, determining an update probability;
identifying the change between the a-priori probability estimation and the update probability;
further wherein determining the a-priori probability estimation comprises determining an a-priori probability distribution $P_0$ using a first number w of a sequence of observations $X_1, \ldots, X_n$ from a probability distribution where $X_i \in U$ and $u = |U|$;
further wherein determining the update probability comprises updating the probability distribution to $P_1^{(n)}$ for every observation $X_n$ where n>w such that the probability $P_1^{(n)}$ can be compared with the a-priori probability $P_0$ in order to detect the change.

2. The method as claimed in claim 1, wherein generating the profile comprises:
reconstructing a historic visit to the website; and
based on the reconstructed visit, generating the profile comprising at least one website attribute relating to the historic visit to the website.

3. The method as claimed in claim 2, wherein reconstructing the visit comprises:
retrieving log information in connection with the historic visit to the website;
based on the retrieved log information, reconstructing the historic visit.

4. The method as claimed in claim 1, wherein generating the profile comprises:
visiting at least once the website; and
based on information collected during the at least one visit, generating profile comprising at least one website attribute relating to the at least one visit to the website.

5. The method as claimed in claim 1, wherein the at least one attribute in the profile relates to at least one of a URL, a domain, an IP address, a content type and a file size.

6. The method as claimed in claim 1, wherein the profile comprises a count associated with the at least one attribute; and
detecting the change comprises:
determining a count associated with the at least one attribute in the profile;
based on the collected information, determining count of the at least one attribute;
identifying a change between the counts associated with the profile and the collected information.

7. The method as claimed in claim 1, further comprising:
updating the at least one attribute of the profile, wherein the updated at least attribute comprises a value corresponding to a weighted combination of a current value in the profile and a value observed in the collected information.

8. An apparatus, comprising:
at least one processing device, said at least one processing device comprising a processor coupled to a memory;
wherein the apparatus is configured to:
generate a profile in connection with a website, wherein the profile comprises at least one attribute associated with the website;
during a visit to the website, collect information relating to the website;
detect a change in connection with the website, wherein detecting the change comprises identifying a variation between the generated profile and the collected information;
assign a score based on the change;
compare the score to a threshold; and
in response to a relationship between the score and the threshold, send an alert identifying a suspicious or malicious website;
wherein detecting the change, comprises:
based on the profile, determining a-priori probability estimation;
based on the collected information, determining an update probability;
identifying the change between the a-priori probability estimation and the update probability;
further wherein determining the a-priori probability estimation comprises determining an a-priori probability distribution $P_0$ using a first number w of a sequence of observations $X_1, \ldots, X_n$ from a probability distribution where $X_i \in U$ and $u = |U|$;
further wherein determining the update probability comprises updating the probability distribution to $P_1^{(n)}$ for every observation $X_n$ where n>w such that the probability $P_1^{(n)}$ can be compared with the a-priori probability $P_0$ in order to detect the change.

9. The apparatus as claimed in claim 8, wherein generating the profile comprises:
reconstructing a historic visit to the website; and
based on the reconstructed visit, generating the profile comprising at least one website attribute relating to the historic visit to the website.

10. The apparatus as claimed in claim 9, wherein reconstructing the visit comprises:
retrieving log information in connection with the historic visit to the website;
based on the retrieved log information, reconstructing the historic visit.

11. The apparatus as claimed in claim 8, wherein generating the profile comprises:
visiting at least once the website; and
based on information collected during the at least one visit, generating profile comprising at least one website attribute relating to the at least one visit to the website.

12. The apparatus as claimed in claim 8, wherein the at least one attribute in the profile relates to at least one of a URL, a domain, an IP address, a content type and a file size.

13. The apparatus as claimed in claim 8, wherein the profile comprises a count associated with the at least one attribute; and
detecting the change comprises:
determining a count associated with the at least one attribute in the profile;
based on the collected information, determining count of the at least one attribute;
identifying a change between the counts associated with the profile and the collected information.

14. The apparatus as claimed in claim 8, wherein the apparatus is also configured to:
update the at least one attribute of the profile, wherein the updated at least attribute comprises a value corresponding to a weighted combination of a current value in the profile and a value observed in the collected information.

15. A computer program product having a non-transitory computer-readable medium storing instructions, the instructions, when carried out by one or more processors, causing the one or more processors to perform a method of:
generating a profile in connection with a website, wherein the profile comprises at least one attribute associated with the website;

during a visit to the website, collecting information relating to the website;
detecting a change in connection with the website, wherein detecting the change comprises identifying a variation between the generated profile and the collected information;
assigning a score based on the change;
comparing the score to a threshold; and
in response to a relationship between the score and the threshold, sending an alert identifying a suspicious or malicious website;
wherein detecting the change, comprises:
based on the profile, determining a-priori probability estimation;
based on the collected information, determining an update probability;
identifying the change between the a-priori probability estimation and the update probability;
further wherein determining the a-priori probability estimation comprises determining an a-priori probability distribution $P_o$ using a first number w of a sequence of observations $X_1, \ldots, X_n$ from a probability distribution where $X_i \in U$ and $u=|U|$;
further wherein determining the update probability comprises updating the probability distribution to $P_1^{(n)}$ for every observation $X_n$ where $n>w$ such that the probability $P_1^{(n)}$ can be compared with the a-priori probability $P_0$ in order to detect the change.

16. The computer program product as claimed in claim 11, wherein generating the profile comprises:
reconstructing a historic visit to the website; and
based on the reconstructed visit, generating the profile comprising at least one website attribute relating to the historic visit to the website.

* * * * *